United States Patent
Fritzsche et al.

(10) Patent No.: US 8,276,112 B2
(45) Date of Patent: Sep. 25, 2012

(54) PERFORMANCE-RELATED DECISION SUPPORT FOR MODEL-DRIVEN ENGINEERING

(75) Inventors: Mathias Fritzsche, Neukirchen (DE); Wasif Gilani, Belfast (IE)

(73) Assignee: SAP AG, Walldorf (DE)

( * ) Notice: Subject to any disclaimer, the term of this patent is extended or adjusted under 35 U.S.C. 154(b) by 1197 days.

(21) Appl. No.: 12/058,282

(22) Filed: Mar. 28, 2008

(65) Prior Publication Data
US 2009/0249281 A1    Oct. 1, 2009

(51) Int. Cl.
*G06F 9/44* (2006.01)

(52) U.S. Cl. ......... 717/104; 717/105; 717/108; 717/136

(58) Field of Classification Search ........................ None
See application file for complete search history.

(56) References Cited

U.S. PATENT DOCUMENTS

2005/0080609 A1*  4/2005  Bhaskaran et al. ............. 703/22
2009/0132562 A1*  5/2009  Mehr et al. .................... 707/100

OTHER PUBLICATIONS

Fritzsche et al., Putting Performance Engineering into Model-Driven Engineering: Model-Driven Performance Engineering, Oct. 2, 2007.*

* cited by examiner

*Primary Examiner* — Li B Zhen
*Assistant Examiner* — Lenin Paulino
(74) *Attorney, Agent, or Firm* — Brake Hughes Bellermann LLP

(57) ABSTRACT

A performance analysis model may be determined based on a development model associated with development of a software process, the development model defining an execution of the software process, and the performance analysis model being annotated with performance data characterizing the execution. At least one user-specified performance profile characterizing performance parameters associated with an improved execution of the software process according to the development model may be determined. An assessment computation model may be determined, using the performance analysis model and the at least one user-specified performance profile. At least one performance-based characteristic associated with the improved execution of the software process according to the development model may be determined. A performance assessment model may be determined using the assessment computation model and the performance-based characteristic, for use in modifying the development model based on the performance assessment model to obtain the improved execution of the software process.

15 Claims, 8 Drawing Sheets

PERFORMANCE-RELATED DECISION SUPPORT FOR MODEL-DRIVEN ENGINEERING

TECHNICAL FIELD

This description relates to model-based processes.

BACKGROUND

Model-driven engineering and related concepts relate, for example, to the use of formalized models to design, manage, implement, and modify software applications and other processes. Such models provide a formalized abstraction of desired software properties and behaviors, and this abstraction provides, among other benefits, an ability of a designer or other user to understand, explain, create, or implement the software application(s) in a manner that is consistent, logical, and efficient.

Although such model-driven engineering provides many improvements and advantages over earlier and other techniques of software development, it still may be difficult to obtain a desired performance from software developed from model-driven engineering techniques. For example, a developer may wish that a software process may take a specified (maximum) amount of time to complete, or may use a specified maximum of computing resources, or have some other performance demand(s). However, many performance analyses may occur at a late stage of the software development process. Consequently, a developer may find that the desired performance demand(s) remain unmet late in a development process, and may therefore be forced to revisit and re-design development model(s) for the software processes, which may be time-consuming and difficult/costly to implement. Moreover, the performance analysis may be performed by a performance expert, which introduces a potentially complicating element of communication between the performance expert and the software developer.

SUMMARY

According to one general aspect, a computer program product may be tangibly embodied on a computer-readable medium and may include executable code that, when executed, is configured to cause at least one data processing apparatus to determine a development model associated with development of a software process, the development model including nodes and branches joining the nodes to define an execution of the software process, determine a performance analysis model that includes performance data characterizing the execution of the software process, the performance analysis model being adapted for simulation of the development model therewith, determine a modification constraint profile characterizing configuration options for implementing the development model, determine a performance objective profile characterizing performance objectives of the execution of the software process, annotate the performance analysis model using the modification constraint profile and the performance objective profile to obtain an assessment computation model, calculate performance assessment data characterizing potential alterations of the development model to obtain improved execution of the software process, based on the configuration options and the performance objectives, annotate the assessment computation model using the performance assessment data to obtain a performance assessment model, and provide the performance assessment model for use in determining how to implement the potential alterations of the development model to obtain the improved execution of the software process.

According to another general aspect, a system may include a user-specified view generator configured to generate a user-specified performance model characterizing performance parameters that are associated with an improved execution of a software process defined by a development model, the development model including nodes and branches joining the nodes to define an execution of the software process. The system also may include a composition engine configured to receive the user-specified performance model along with at least one performance analysis model obtained from the development model, the performance analysis model including performance data characterizing the execution of the software process, and further configured to compose an assessment computation model which aggregates the user-specified performance model and the at least one performance analysis model. The system also may include an assessment computation engine configured to receive the assessment computation model and determine a performance-based characteristic associated with the improved execution of the software process, based on the user-specified performance model and the performance analysis model, and further configured to determine a performance assessment model using the performance-based characteristic and the assessment computation model, for modification of the development model based thereon to obtain the improved execution of the software process.

According to another general aspect, a performance analysis model may be determined that is based on a development model associated with development of a software process, the development model including nodes and branches joining the nodes to define an execution of the software process, and the performance analysis model being annotated with performance data characterizing the execution of the software process. At least one user-specified performance profile characterizing performance parameters that are associated with an improved execution of the software process according to the development model may be determined. An assessment computation model may be determined, using the performance analysis model and the at least one user-specified performance profile. At least one performance-based characteristic associated with the improved execution of the software process according to the development model may be determined. A performance assessment model may be determined using the assessment computation model and the performance-based characteristic, for use in modifying the development model based on the performance assessment model to obtain the improved execution of the software process.

The details of one or more implementations are set forth in the accompanying drawings and the description below. Other features will be apparent from the description and drawings, and from the claims.

DETAILED DESCRIPTION

Figure 1:
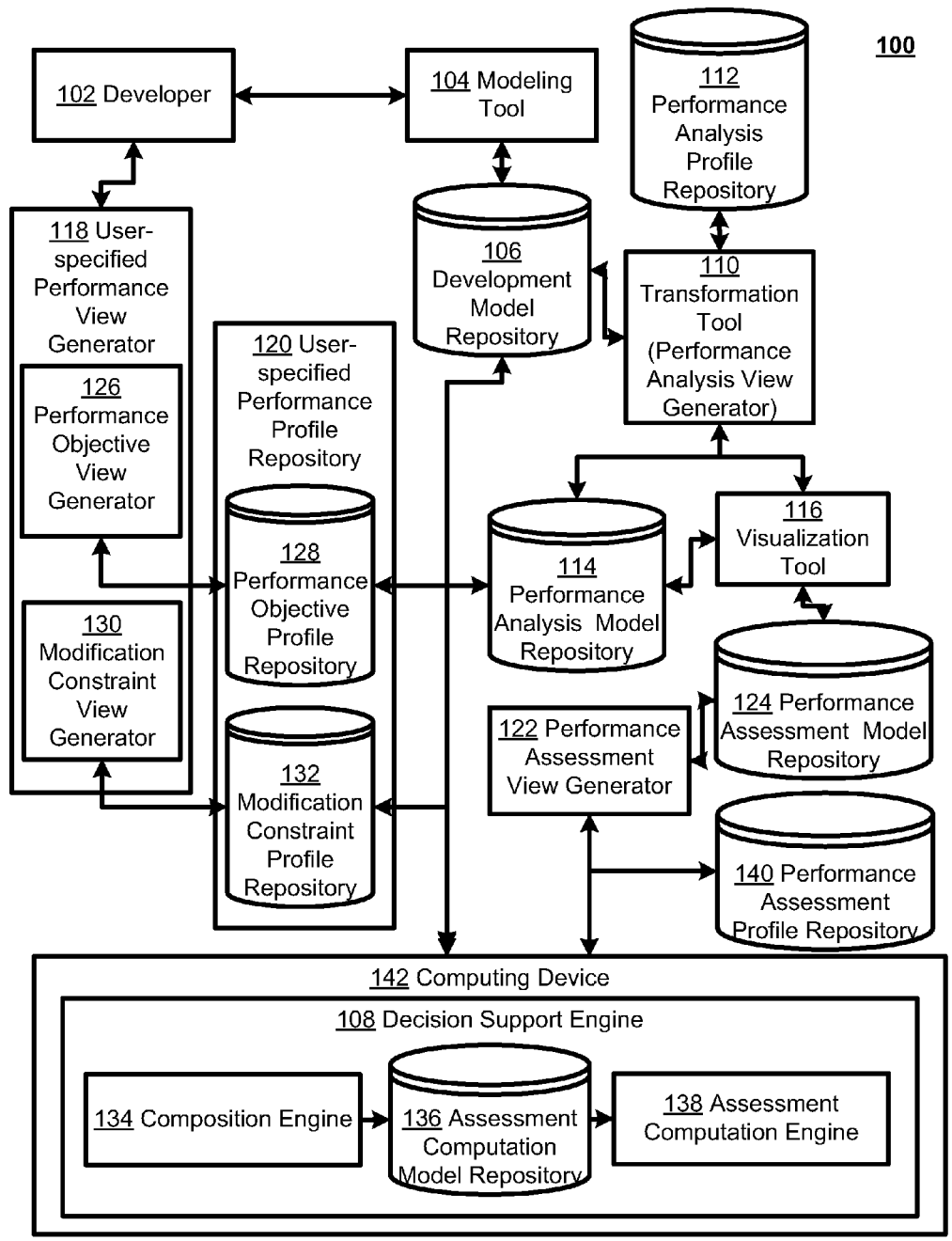
FIG. 1 is a block diagram of a system for providing performance-related decision support for model-driven engineering.

FIG. 1 is a block diagram of a system 100 for providing performance-related decision support for model-driven engineering. In the example of FIG. 1, the system 100 allows a software developer 102 to make performance-related decisions for a software application or process being developed, at an early stage in the development process and without requiring substantial time/effort or performance expertise to make or implement the performance-related decisions. For example, the system 100 may provide decision support to the developer 102 to assist the developer 102 in choosing between a number of possible alterations to a development model, where the potential alterations are related to making a performance improvement in the execution of the related software process(es). In this way, for example, the developer 102 may be assisted in developing software applications which meet performance demands and which are produced according to a development schedule, and without requiring substantial input or expertise of performance experts.

Further in FIG. 1, the developer 102 uses a modeling tool 104 to design development models that may be stored in a development model repository 106. The modeling tool 104, except as described differently herein, may contain various necessary conventional elements used to create development models, such as a graphical user interface (GUI) used to create or select (e.g., through drag-and-drop techniques) one or more shapes associated with nodes of the development models (e.g., activity nodes, execution nodes, or decision/control nodes, the latter including, for example, split/join, synchronize, fork, loop, and other known constructs for controlling a flow and execution order of the development model, along with tools to join the various nodes using branches to obtain the desired execution order). One example of the modeling tool 104 is the Eclipse Modeling Framework (EMF), which provides many different modeling tools, along with an extension capability that allows users to add functionalities in the form of plug-ins that may be used within the framework.

In FIG. 1, the term development model may refer to virtually any model used to design and implement software-based applications or processes. Specifically, the term development model may be used to refer to the use of the system 100 in a software development (e.g., creation or design) context. Of course, it may be appreciated that the development model ultimately may be saved and deployed in association with a fully-tested and released software application that is no longer under active development, and yet the system 100 may still be used in such a context, e.g., if further performance demands warrant.

The development models may be technical models describing operations of software applications written in a particular language (e.g., Java), or may be models describing software processes governing business or other human-implemented activities (e.g., workflow process models that issue directions and receive responses from machine or human actors implementing steps of the process model). In the examples provided herein, the models are generally described as Unified Modeling Language (UML) models, for the sake of clarity and consistency in the description. However, many other modeling languages exist, where non-limiting examples of other such modeling languages may include the Business Process Modeling Notation (BPMN), Business Process Execution Language (BPEL), Web Services BPEL (WSBPEL), Event-Driven Process Chain(s) languages, and languages in the area of Fundamental Modeling Concepts.

As described herein, the development models of the development model repository 106 may be large, detailed, and complex. There may exist a number of issues associated with the development models which may result in an undesired or insufficient performance thereof. For example, the developer 102 may simply make a mistake, e.g., in assigning too few computing resources to a particular task or set of tasks, or make some other error that results in unsatisfactory performance. Given that a particular development model may be large and complex, as just referenced, it may be difficult for the developer 102 to determine the source of the unsatisfactory performance, and/or to determine a correction or improvement to obtain satisfactory performance.

In particular, as described below with respect to FIGS. 6 and 7, it may occur that a development model is associated with a layered software application, e.g., an enterprise service architecture (ESA) or other architecture which builds more complicated, more user-friendly, and/or more detailed software layers on top of lower-level layers which provide underlying foundational elements, including the physical computing resources necessary to execute the software applications in question. In such cases, when a performance of the software application is unsatisfactory (e.g., too slow), it may occur that the source of the delay in execution is in one or more of the layers, and, moreover, it may be difficult to tell which layer is the source of the delay. For example, an apparent delay in communicating with a software service over a network actually may stem from an underlying delay in accessing a record from a database.

Thus, in the system 100, a decision support engine 108 is provided which assists the developer 102 in determining whether and how to improve a performance of a software process described by a development model from the development model repository 106. For example, the decision support engine 108 may assist the developer 102 in determining which node of the development model is most likely to be associated with a performance delay, and what the source of the delay is, as well as what corrective action may be taken to correct the delay. In so doing, the decision support engine 108 may provide a reduced amount of information to the developer 102; e.g., instead of providing performance information for all possible nodes of the development model, the decision support engine 108 may limit the information only to those nodes which are associated with modifiable attributes, and/or may provide an optimized combination of nodes to be modified to obtain a desired result/improvement. In this way, the developer 102 is provided with performance decision support for model-driven engineering, and may independently improve a performance of a development model, with a minimum of time, effort, and cost, and without assistance (or minimal assistance) from a performance expert.

Example operations of the decision support engine 108 are provided in more detail, herein. For example, a transformation tool 110, perhaps in conjunction with the modeling tool 104, may be used to apply a performance analysis profile from a performance analysis profile repository 112 and obtain a performance analysis model to be stored in a performance analysis repository 114, and thereafter used as an input to the decision support engine 108, as shown and described. Such a performance analysis model may be, for example, a conventional performance analysis model used by performance experts to performance-test development models.

In this context, the term profile (or, similarly, profile model or profile meta-model) refers to a technique for extending a functionality or use of an underlying model, as described in more detail below, e.g., with respect to FIG. 2. For example, it is generally known that models at a given layer of abstraction may be extended in order to provide a desired use, feature, or functionality for an associated software application, such as when an otherwise generic model/application is to be implemented in a more specific context or domain. Such extensions may themselves be formalized, so that designers or other users may add desired features or functionalities to models in a straight-forward, consistent manner. For example, models expressed in the Unified Modeling Language (UML) may be associated with a number of such profiles, e.g., meta-models providing extensions to the language they effectively extend (e.g., UML). The extensions can provide domain specific information, such as, for example, when a UML model may include an element (node) that is associated with a particular software component (e.g., a software component associated with processing a credit card transaction). Then, for example, a designer may wish to associate a security profile to the element, in order to provide a desired level of security for the credit card transaction. Since the security profile itself may be pre-defined and substantially uniform, the designer or other user may also apply the same security profile to other elements of the example UML model, or to (elements of) other UML models entirely.

Analogously, in the performance realm, performance profiles may exist which characterize a performance or execution of the software process characterized by a development model. For example, such performance profiles may characterize a probability of execution of a branch of a development model, or a resource usage of a node of the development model, or an average time of execution of a node of the development model, or other performance-related information. Examples of such performance profiles include the Scheduling, Performance, and Timing (SPT) profile, the Modeling and Analysis of Real-Time and Embedded Systems (MARTE) profile among others. Specialized performance profiles also may be constructed by the developer 102 or others for use in the system 100.

Once the performance profile has been applied (also referred to as being "annotated" or "stereotyped") to a corresponding development model, the transformation tool 110 may be used to transform the resulting model into a form suitable for simulation, e.g., using a visualization tool 116. An example of the transformation tool 110 may include, for example, the Atlas Transformation Tool (ATL) which may be used to transform an annotated model into a model suitable for simulation by a visualization tool such as, for example, the AnyLogic simulation tool.

Thus, performance data may be collected for the development model in question, e.g., by actually executing the software process and collecting data thereon, or, as just referenced, by simulating the execution and collecting the simulated results to use in constructing the performance data. Such performance analysis models may conventionally be used by performance experts to attempt to improve a performance of the related software process, but, as such, may require specialized skills and knowledge to interpret the performance analysis model and determine an appropriate alteration of the development model. For example, the performance analysis model may be used to determine potential bottlenecks in the development model, which refers generally to a node of the development model having a long execution time and/or high resource usage and that therefore may impede, or serve as a limiting factor to, the execution of other nodes of the development model.

Although such information is potentially useful, it is also true that the practical application of such knowledge may be difficult at best. For example, in a large development model of 100, 1000, or more nodes, there may be many potential or apparent bottlenecks, so that it may be difficult to determine which node should be altered to clear the delay. In particular, bottlenecks may be related to one another, e.g., in a causal relationship, so that clearing one bottleneck may or may not clear a number of others. Similarly, and as referenced herein, a source of a bottleneck may be difficult to determine, particularly in a layered software paradigm in which a bottleneck at one layer actually may result from a bottleneck in a different (e.g., lower) layer.

Consequently, the decision support engine 108 may be configured to input the performance analysis model for combination with a user-specified performance profile or other model (or meta-model). The decision support engine 108 may then use the user-specified profile(s) to customize the performance analysis model to facilitate performance decisions by the developer 102. For example, the decision support engine 108 may effectively filter the performance analysis model so that performance metrics (e.g., metrics related to potential bottlenecks) are only presented with respect to nodes having parameters which the developer wishes (or is able) to change, or with respect to nodes which are most likely to yield performance improvements if altered. In other examples, the decision support engine 108 may provide performance support by restricting possible alterations to the underlying development model which fall within some user-specified range or otherwise conform to some user-specified constraint.

In FIG. 1, a user-specified performance view generator 118 is illustrated that may be used to generate user-specified performance profiles within a user-specified performance profile repository 120. For example, the user-specified performance view generator 118 may be associated with, or part of, the modeling tool 104 (e.g., a plug-in to the EMF) and may generate a GUI that allows the developer to specify performance parameters associated with a potential improved execution of the relevant software processes, including potential alterations to the associated development model. The resulting profiles may be stored in the user-specified performance profiles 120.

For example, it may occur that the development model in question is associated with a software process including a workflow performed in part by human workers in a department of a corporation, and the developer 102 (or other authorized user) may specify a minimum and maximum number of employees that may be assigned to that department. Later, in optimizing the development model for performance, e.g., for performing the workflow within a specified maximum amount of time, the developer 102 may decide to allocate an appropriate number of employees to the relevant department, up to the maximum, in an attempt to obtain the desired result. Further, in some implementations, the decision support engine 108 may proactively suggest a number of employees to assign, within the specified range. For example, the decision support engine 108 may suggest some number of employees lower than the maximum number, and suggest re-assigning the remaining employees to a separate department that may be associated with a primary bottleneck in the development model and that may therefore provide a larger net benefit in reducing the overall execution time.

To provide the type of performance decision support just described, the decision support engine 108 may combine the performance analysis model with the user-specified performance profile to obtain a performance assessment model that may be provided using a performance assessment view generator 122 and stored in a performance assessment repository 124, as shown. It may be appreciated from the above discussion that the performance assessment model thus provides a model which may be simulated using the visualization tool 116, but with specific simulations that are limited or otherwise customized to the performance parameters associated with the user-specified profiles, and that are therefore more intuitive and manageable for the developer 102. Further, as described in more detail below, such simulations may include specific visualizations of possible performance metrics and/or performance optimizations (e.g., different combinations of potential alterations to the development model, each of which may offer a different level or type of improved execution), to thereby assist the developer 102 in selecting a preferred performance optimization.

In the example of FIG. 1, the user-specified view generator 118 includes a performance objective view generator 126 that may be used to generate a performance objective profile to be stored in a performance objective profile repository 128, as shown. As described in detail herein, such performance objective profiles may include potential annotations to the performance analysis model that are related, e.g., to performance requirements of the development model (e.g., a requirement that an entire associated software process completes in a maximum amount of time, or a requirement that a maximum amount of computations resources be assigned to a particular node/task), or to performance improvements (e.g., changes that are within the specified range of performance requirements, and that then provide some other performance objective, such as an increased resource utilization associated with improving profitability).

As another example, a modification constraint view generator 130 may be used to generate modification constraint profiles to be stored in a modification constraint profile repository 132. Such modification constraint profiles may provide, for example, configuration options having a specified range or type. In the former example, the range may be a range of employees, as above, or of some other parameters, while in the latter example, the type may be, e.g., specified as fixed or variable.

Thus, in operation, and as described, the decision support engine 108 may be configured to input a performance analysis model and one or more user-specified performance profiles (e.g., a modification constraint profile and/or a performance objective profile), for combination thereof into a performance assessment model. In executing these operations, a composition engine 134 may be used to determine an assessment computation model stored in an assessment computation repository 136 that may then be used by an assessment computation engine 138 to determine the actual performance assessment model of the performance assessment model repository 124. For example, the assessment computation model may be used as a foundational model for calculating performance-based characteristics, e.g., performance metrics or performance optimizations, which the assessment computation engine 138 may use as part of a performance assessment profile of a performance assessment profile repository 140 to annotate the assessment computation model and thereby obtain the performance assessment model.

In this regard, as described in more detail herein, it will be appreciated that the performance assessment model may be considered to be a synchronization of the development model with the assessment computation model/performance assessment profile. That is, information regarding the development model is implicitly contained within the assessment computation model, since the development model is an input to the decision support engine 108. At the same time, the system 100 could be described as providing a performance assessment model/view that is later integrated/synchronized with the development model (e.g., directly, or by way of the performance analysis model that is itself based on a transformation of the development model).

However the system 100 is described or implemented, it may be appreciated that, as described herein, the visualization tool 116 may be used to provide a visualization of the performance-based characteristic (e.g., performance metric) of the performance assessment model in synchronization with the development model, including visualizations for suggested optimizations for what in a design or resource mapping of the development model (e.g., a mapping of a development model node to human resources) can or should be changed to obtain an improved execution of the development model and the associated software process(es).

Finally in FIG. 1, a computing device 142 is illustrated that represents one or more data processing apparatuses that may be used to implement the system 100 of FIG. 1. That is, although only a single computing device housing the elements 108, 134, 136, and 138 is illustrated it will be appreciated that multiple computers, e.g., networked together, may be used to implement the system 100. Similarly, although the decision support engine 108 is illustrated as including only the elements 134, 136, 138, it will be appreciated that other elements of FIG. 1 may be considered to form part of the decision support engine 108, depending, e.g., on a preferred mode of description and/or on a preference of a designer or user of an implementation of FIG. 1.

In the practice of implementing the system 100, it may occur that one or more of the various model/profile repositories 112, 114, 120, 124, 128, 132, 136, and/or 138 each may contain a large number of profiles or other models, each of which may contain a large number of nodes and/or potential profile extensions/annotations to be applied to the nodes. Consequently, it may be difficult or impractical to provide a specified profile for desired models/elements of a software application.

For example, the developer 102 may wish to apply a modification constraint such as a min/max number of employees that may be assigned to a department associated with a node or type of node, as described above. However, the department and node (type) may occur multiple times within a single development model and/or profile meta-model, and also may occur one or more times within a group or collection of such models/profiles. Moreover, although the developer 102 may wish to specify a particular employee range at a point in time, it may later occur that a different range may be desired (e.g., if a new employee is hired, or a current employee leaves or is reassigned). Therefore, it may be problematic to specify and thereafter update the accurate/desired range everywhere that the associated node/department appears within the model(s) in question.

Consequently, the system 100 of FIG. 1 may use one or more annotation engines that allow the developer 102 to apply the described profiles and model transformations, compositions, and/or computations in a flexible, automated manner. In this regard, it may be appreciated that the modification constraint profiles and the performance objective profiles may be constructed as specialized models designed for the system 100, as opposed to, for example, standard profiles for use with UML models. In this sense, the modification constraint profiles, the performance objective profiles, or the user-specified performance profiles in general may be considered to be, respectively, a modification constraint view, a performance objective view, or a user-specified performance view representing a standard UML profile, a specialized model, or some other appropriate view of the performance constraints, objectives, or other performance parameters that may be used in the system 100 (similarly, the performance analysis model(s) and the performance assessment model(s) of FIG. 1 also may be considered to be performance analysis "view(s)" and performance assessment view(s)," so that the transformation tool 110 may be considered to contain or work in conjunction with a performance analysis view generator, as shown).

Nonetheless, due to the factors referenced above (e.g., large number of model nodes/elements, large number of profile elements/annotations, and/or potentially frequent changes/updates of the models or profiles), it may be advantageous to be able to use such flexible, automated annotation engine(s) referenced herein to implement the system 100. For example, FIG. 2 is a block diagram of a system 200 for annotation of models for, among other functionalities, performance decision support in model-driven engineering.

Figure 2:
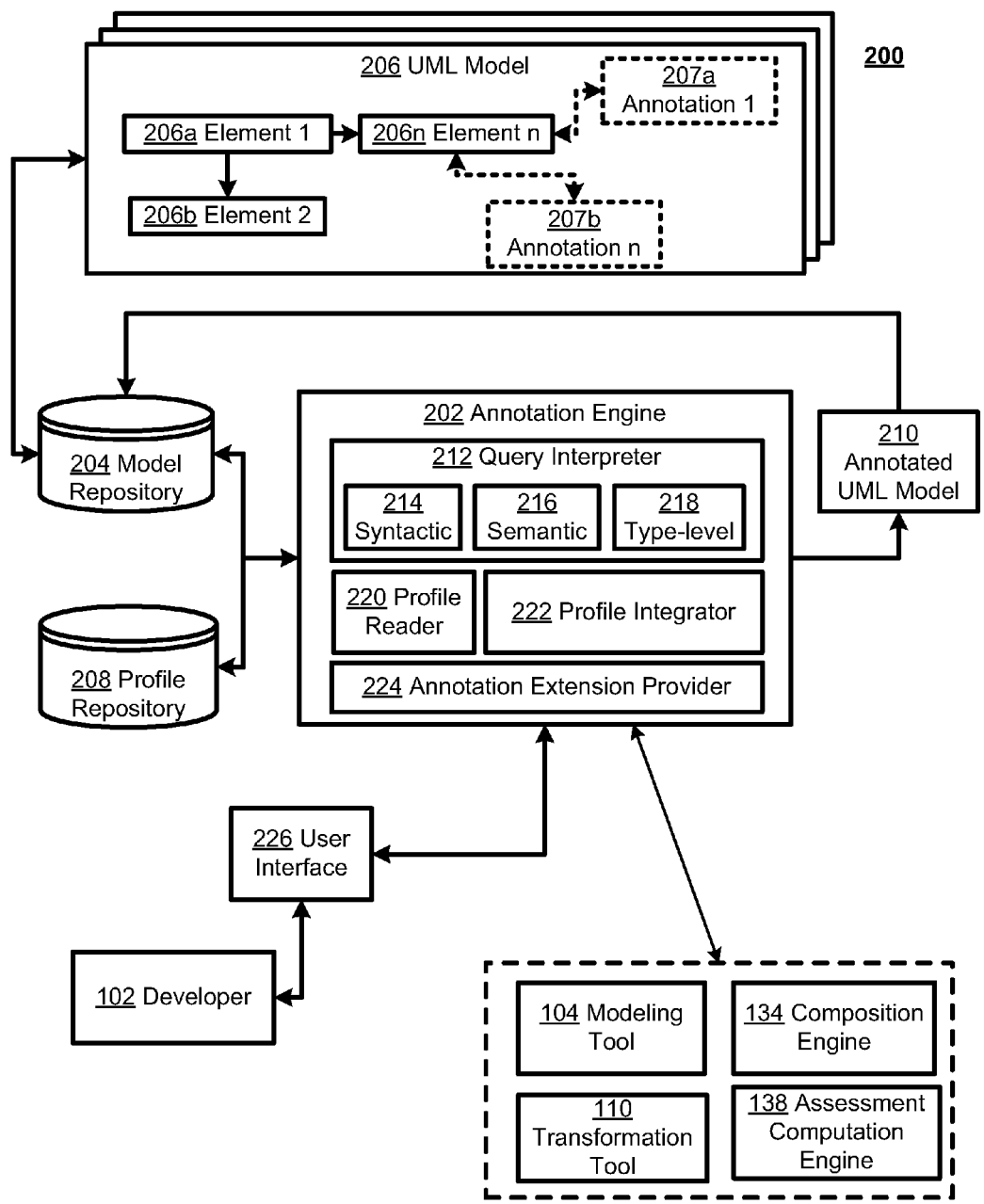
FIG. 2 is a block diagram of a system for annotation of models for performance decision support in model-driven engineering.

Thus, FIG. 2 illustrates an annotation engine 202 that may be used to perform various aspects of the system 100 of FIG. 1. More specifically, the annotation engine 202, as shown, may be used in conjunction with, or as part of, one or more of the modeling tool 104, the transformation tool 110, the composition engine 134, and the assessment computation engine 138. That is, the discussion of FIG. 2 is primarily provided in the context of a generic version of the annotation engine 202, which may be used in whole or in part by any of the elements 104, 110, 134, and 136 to execute the functionality described above, and which is therefore described essentially independent of any one of these tools for the purposes of FIG. 2.

Thus, in the example of FIG. 2, the annotation engine 202 may be configured to query a model repository 204 to obtain desired elements and/or desired models (e.g., a model 206, shown in FIG. 2 as a UML model). It will be appreciated, then, that the model repository 204 may represent any of the model repositories of FIG. 1, such as the development model repository 106, or the performance analysis model repository 114.

The annotation engine 202 also may access a profile repository 208 containing a number of possible profiles to be provided to the UML model 206 (e.g., to elements thereof). Then, the annotation engine 202 may extend or modify the obtained models/elements using the accessed profiles, to thereby obtain an annotated model 210. The annotated model 210 may then be used to implement an associated software application (not illustrated in FIG. 2, but considered to be, for example, any of the various software applications, workflow processes, or other software processes described herein), and/or may be returned to the model repository 104 for further annotation thereof, as desired. It will be appreciated that the profile repository 208 may thus represent, for example, any of the profile repositories 112, 120, 128, 132, or 140 of FIG. 1.

Thus, the annotation engine 202 allows for convenient and flexible access to the model repository 204 and to the profile repository 208, even when the repositories 204, 208 contain large numbers of models and profiles, respectively. Consequently, for example, designers or other users may easily obtain only those models/elements that are desired for annotation thereof. Further, the resulting annotation(s) may proceed in an automatic, intuitive fashion. As a result, designers or other users may provide the annotated model 210 as a more domain-specific version of the original, more abstracted model 206, and, if necessary, may also later modify the annotated model 210 (e.g., change the annotation or add a new annotation/profile) in a straight-forward fashion.

As may be appreciated from the above description, then, the model repository 204 may contain hundreds or thousands of models, where each model may contain tens, hundreds, or thousands of elements or other nodes. In the simplified example of FIG. 2, the single UML model 206 is illustrated as including element 1 206a, element 2 206b, and element n 206n. That is, as may be understood from basic principles of UML, the UML model 206 may include these elements 206a, 206b, 206n as being graphically represented and arranged to illustrate a functionality, operation, or other characteristic of an associated software application or other process. More detailed and specific examples of UML model 206 and associated elements are provided herein.

Meanwhile, as described, one or more profile meta-models or profiles provided for UML may exist in the profile repository 208. As a result of the operations of the annotation engine 202, as described herein, an annotation 207a and 207b may be applied to the UML model 206 as extensions of the element 206n. For example, the annotation 207a may be an example of a vertical profiling (e.g., a specification that a software component associated with the element 206 should be implemented using CORBA), and may be applicable only to the element 206n within the context of the UML model 206 and its associated software application. Meanwhile, the annotation 207b may be an example of horizontal profiling, such as a security annotation specifying an encryption algorithm to be used by the associated software component (here, a CORBA component). Then, although the UML model 206 illustrates the annotations 207a, 207b in dashed line to illustrate their optional addition to the UML model 206 based on actions of the annotation engine 202, it may be appreciated that the inclusion of the annotations 207a, 207b allow the UML model 206 to serve as an example of the annotated UML model 210, as well (which, as described, may be returned to the model repository 204 for use and/or for further annotation thereof).

Many other examples of models, elements, and associated annotation or profiling thereof are described herein. In general, the concepts related to the extension of models/elements through the use of an associated extension or profile meta-model may be known or characterized by a plurality of terms and terminologies. For example, although the extension of the UML model 206 is described herein as using a profile meta-model for profiling the UML model 206 through annotation of one or more elements thereof, it may be appreciated that such model extensions also may be referred to as refining, branding, stereotyping, integrating, composing, or specifying the models/elements, or may be referred to as adding metadata to the models/elements. Such terminology may be overlapping or interchangeable, or may be dependent on the type of modeling language, model, or element being extended/annotated. Further, although the elements 206a, 206b, 206n are referred to as being associated with a software component, it may be appreciated that UML includes other (or more specific) types of elements, e.g., interface elements, activity elements, class elements, operation elements, or state machine elements.

Thus, in general, in the context of UML models used in the present examples, the concept of profiling the models/elements is known, and is not described further herein, except to provide illustrations and examples of operations of the annotation engine 202 in various contexts of the system 100 of FIG. 1. However, although concepts of profiling/annotation are known to some extent in UML, Java, or other contexts, these known concepts, by themselves, may suffer reduced or eliminated utility relative to the example system 200 of FIG. 2. For example, as already referenced, the model repository 204 may contain hundreds or thousands of models, so that, without the annotation engine 202, a designer or other user may need to sort through the many models in order just to find the desired models/elements, and then proceed to add a desired annotation(s) to each element. If a designer fails to determine all desired models/nodes, or determines incorrect ones of the desired models/nodes, then the resulting annotation will be incorrect and/or incomplete. Moreover, even if the desired annotation is completed accurately, the time required to do so may be impractical. Still further, even if the desired annotations are completely and correctly added, it may later occur that the annotation(s) themselves must be amended or corrected, whereupon the designer may have to re-implement the process of locating desired models/elements for (re) annotation thereof. In contrast, the annotation engine 202 allows for flexible, automated profiling that may be completed quickly and accurately by non-profiling experts, and may be repeated as circumstances warrant.

In particular, the annotation engine 202 allows querying of the model repository 204 in a manner that returns, as a result set, desired models/elements that the designer or other user wishes to annotate. For example, the annotation engine 202 may include a query interpreter 212 that executes queries against the (e.g., performance-related, development model or performance analysis model) model repository 204. These queries may include, for example, syntactic queries 214, semantic queries 216, or type-level queries 218.

The annotation engine 202 further includes a profile reader 220 that may be configured to obtain a desired profile meta-model from the profile repository 208, and a profile integrator 222 that may be configured to receive the profile meta-model from the profile repository 208 for the creation and integration of instances thereof with the result set of models/elements provided by the query interpreter 212. Then, as described herein, the profile integrator 222 may be configured to output the annotated UML model 210 (e.g., back to the model repository stations and/or for use in an associated software application or other process).

In some implementations, the annotation engine 202 may be configured to compile, interpret, or otherwise process a domain-specific language (DSL) to obtain the properties and functionalities described herein, such as the Query and Annotation Language (QUAL). For example, one or more such DSL(s) may provide for the querying of the model repository 204 by the query interpreter 212, the reading of the profile repository 208 by the profile reader 220, and/or the annotation of the retrieved model/elements with instances of the retrieved profile(s) by the profile integrator 122.

An annotation extension provider 224 may refer to a software element that executes or calculates some particular function, algorithm, or metric in conjunction with the annotation(s) performed by the annotation engine 202. For example, the annotation engine 202 may query the model repository 204, and may then read the profile(s) from the profile repository 208 in conjunction with executing some calculation (e.g., calculating a bottleneck strength, as described herein), the result of which may then be used in the resulting annotated model 210 (e.g., the performance assessment model of the repository 124 of FIG. 1).

Thus, a DSL of FIG. 2 may be extended using extension points in order to make use of non-domain specific languages (e.g., Java) to perform certain types of annotations of the UML model 206. The usage of the UML models that are handed over to the extension points that may be implemented in a non-domain specific language is not limited to annotation. For instance, the UML models may be transformed further to more concrete models and/or implementations, or may be executed by the extension points directly. More details of extension points, as well as features of other example implementations, are provided herein.

A user interface 226 may represent a graphical user interface (GUI) used by a designer or other user to utilize the annotation engine 202, and/or may include a browser, a text editor, or any known technique to, for example, enter query parameters or otherwise specify models or profiles. The user interface 226 may be provided to or accessed by the developer 102 or other users.

Although FIG. 2 illustrates a number of example implementations of the annotation engine 202, it will may appreciated that these examples are illustrative, and non-limiting. Additional or alternative examples are provided herein, and still further implementations, not explicitly discussed, also would be apparent to those of skill in the art.

Figure 3:
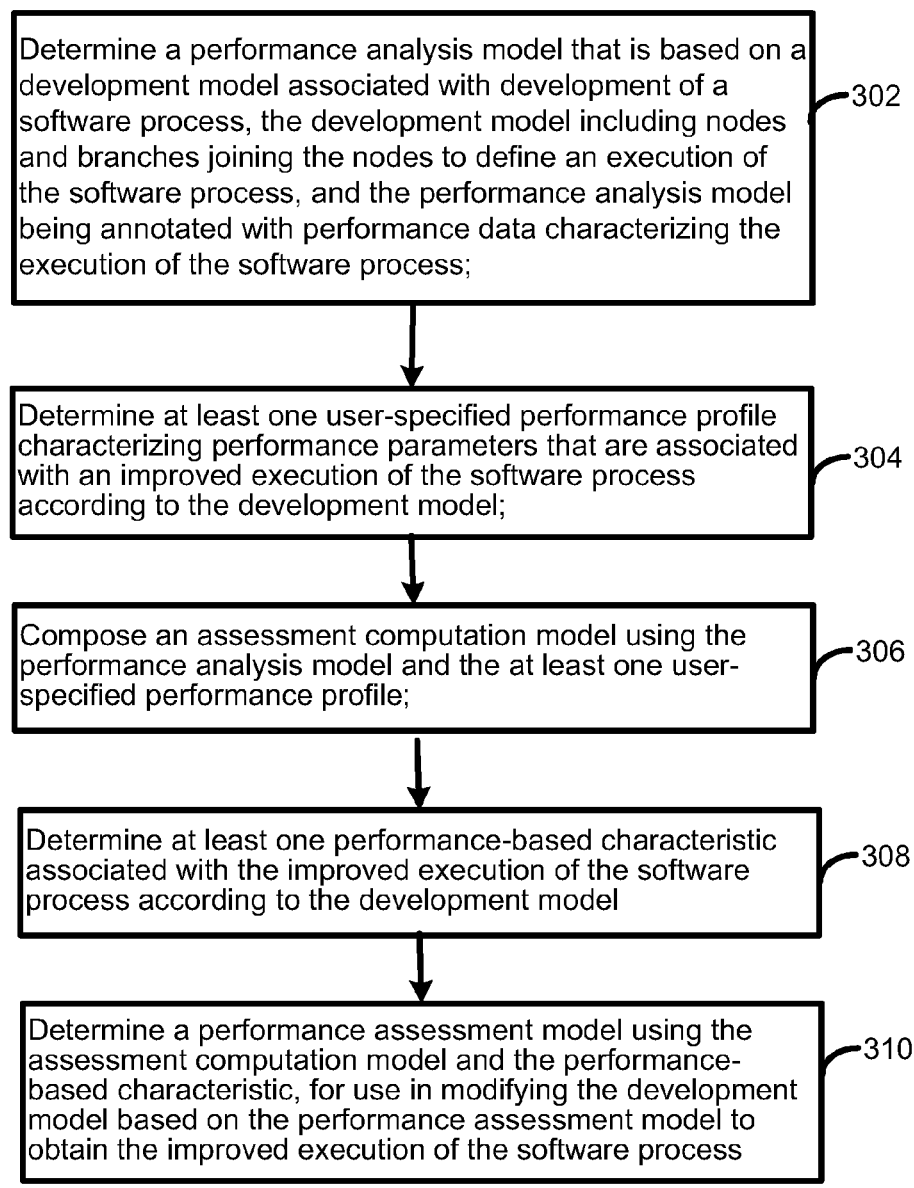
FIG. 3 is a flowchart illustrating example operations of the system of FIG. 1.

FIG. 3 is a flowchart 300 illustrating example operations of the system 100 of FIG. 1. In the example of FIG. 3, a performance analysis model that is based on a development model associated with development of a software process may be determined, the development model including nodes and branches joining the nodes to define an execution of the software process, and the performance analysis model being annotated with performance data characterizing the execution of the software process (302). For example, as shown in FIG. 1, the decision support engine 108 may include the composition engine 134 that is configured to input a performance analysis model from the repository 114 that represents a transformation of a development model from the repository 106, e.g., based on a performance analysis profile. A simplified example of a development model is illustrated with regard to FIG. 8, below.

At least one user-specified performance profile characterizing performance parameters that are associated with an improved execution of the software process according to the development model may be determined (304). For example, the composition engine 134 may input such a user-specified performance profile from the repository 120, and perhaps including one or more of the modification constraint profile(s) or the performance objective profile(s) from the repositories 128, 132, respectively.

An assessment computation model may be composed, using the performance analysis model and the at least one user-specified performance profile (306). For example, the composition engine 134 may compose the assessment computation model(s) of the assessment computation model repository 136 of FIG. 1. As described with respect to FIG. 2, it will be appreciated that the composition engine 134 may determine the performance analysis model and the user-specified performance profile using the annotation engine 202, e.g., by querying the various repositories and then automatically annotating the model(s) with the profile(s).

At least one performance-based characteristic associated with the improved execution of the software process according to the development model may be determined (308). For example, an assessment computation engine 138 may be configured to determine a performance assessment profile from the corresponding repository 140, including a performance metric (e.g., bottleneck strength or other metric, as described herein) and/or a performance optimization (e.g., a suggested mapping of human resources/employees to perform a specific task of the development model). As described, when an instance of the annotation engine 202 is used in the assessment computation engine 138, the annotation extension provider 224 may be used to calculate the performance-based characteristic(s).

A performance assessment model may be determined using the assessment computation model and the performance-based characteristic, for use in modifying the development model based on the performance assessment model to obtain the improved execution of the software process (310). For example, the assessment computation engine 138 may be used to generate the performance assessment view/model, perhaps in conjunction with the performance assessment view generator 122. Continuing the above example in which an instance of the annotation engine 202 is used, the performance-based characteristic may be used as an extension so that the profile integrator 222 may then automatically annotate the performance-based characteristic to the development model as the performance assessment model.

Figure 4:
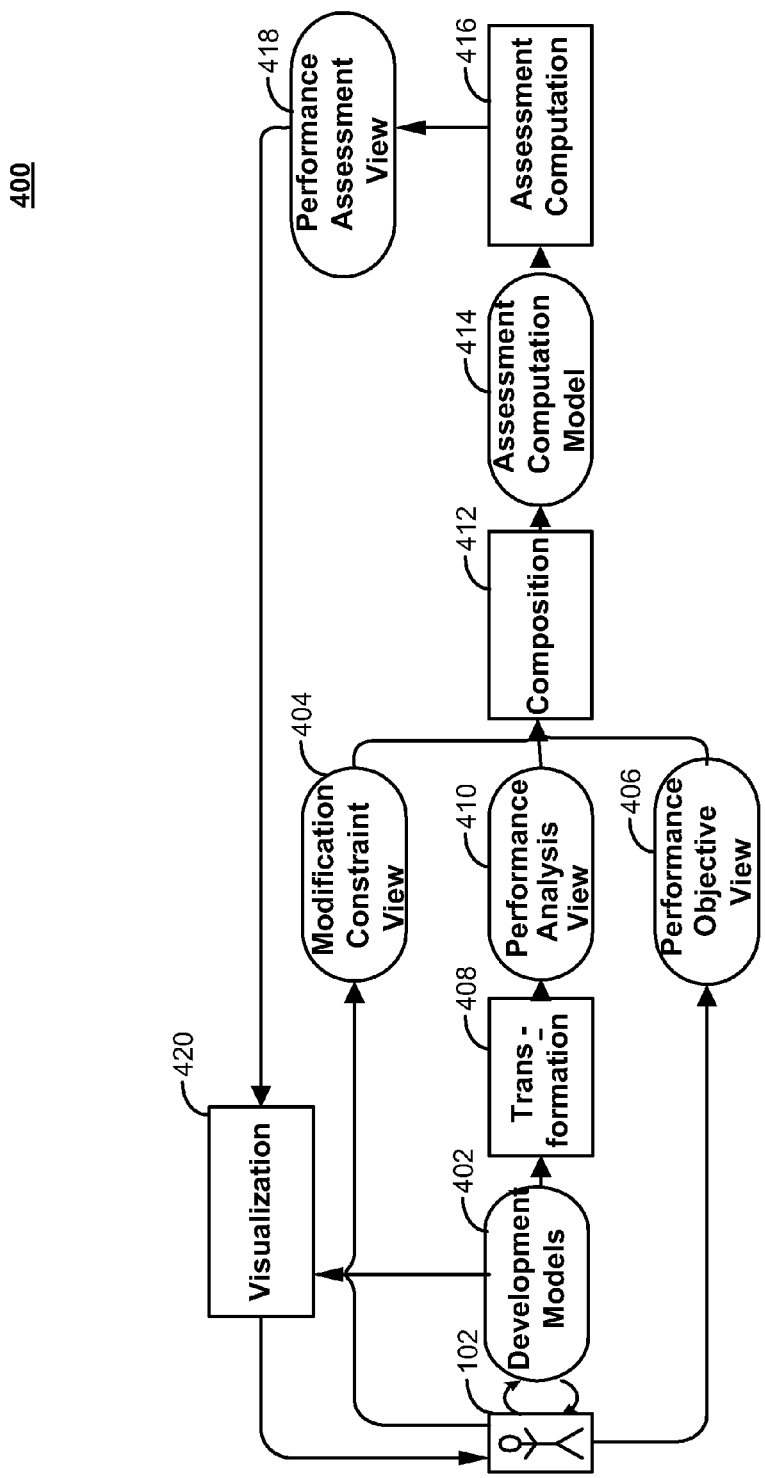
FIG. 4 is a flowchart illustrating further example operations of the system of FIG. 1.
Figure 5:
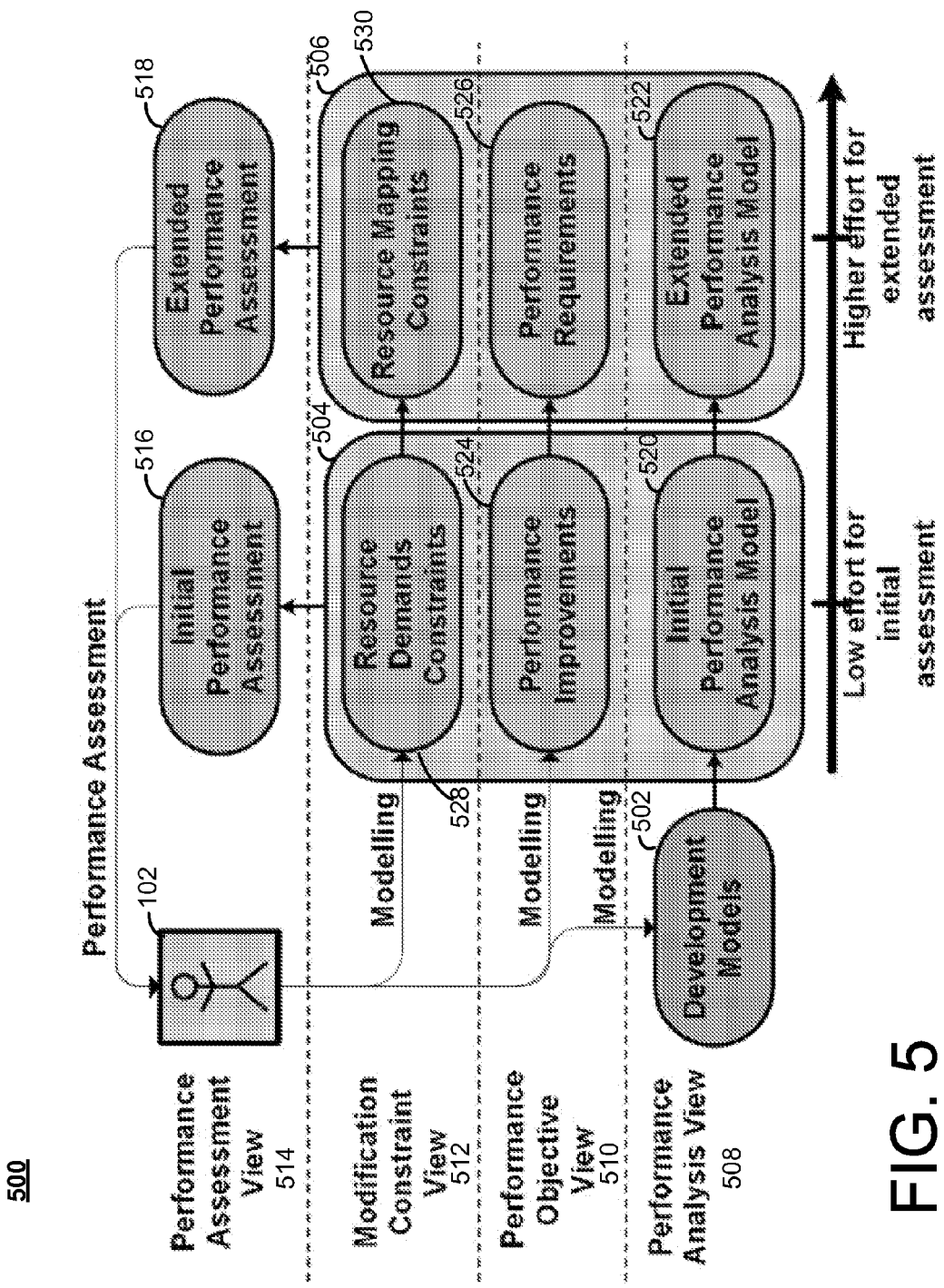
FIG. 5 is a block diagram illustrating stepwise performance assessment using the system of FIG. 1.

FIG. 4 is a flowchart 400 illustrating further example operations of the system 100 of FIG. 1. Discussion of FIG. 4 is also given with respect to FIG. 5, which is a block diagram of a stepwise implementation of the flowchart 400 of FIG. 4. More particularly, FIG. 5 illustrates a block diagram in which development models 502 are analyzed using a low effort for an initial performance assessment (504, 516), and a higher effort for an extended performance assessment (506, 518), and using the various views 508-514 described herein.

In FIG. 4, and with reference to the above description, the developer 102 may be responsible for generating or otherwise determining a development model 402, a modification constraint view 404, and a performance objective view 406. As referenced above, the modification constraint view may specify configuration options/constraints in the design in order to provide decision support which is realizable and hence useful. For example, Resource Demand Constraints 528 may be used as input for an initial performance assessment 516 and Resource Mapping Constraints 530 as input for extended performance assessment. With Resource Demand Constraints, for example, resource demands may be considered as fixed, e.g. for the specification of resource demands of third party services, or as variable. Resource Mapping constraints may reference computing or human resources as duplicable or single-only resources. Using these and/or other constraints, the modification constraint view may be used to effectively filter the resulting performance assessment view(s) 516, 518 for user needs.

Meanwhile, the performance objective view, as described, is concerned with the modeled system should perform. As shown in FIG. 5, this view may be split into the specification of performance improvements 526 and performance requirements 528. Performance improvements may be concerned with maximizing the (computing or human) resource utilization and minimizing the response time of the modeled system. The performance improvements may be specified in an initial step as an input for initial performance assessment, as shown, whereas specifications of performance requirements, (which may be specific for factors due to contention of resources) may be considered as an input(s) for extended performance assessment.

The performance objective view is also thus used to filter the resulting performance assessment view for user needs and, in addition, to select metrics of interest for the user. For example, a metric(s) may be supported for initial performance assessment, and a separate metric(s) may be supported for extended performance assessment. The performance objective view also may be used to compute metrics of interest by calculating dependencies between performance objectives and design decisions within development models. Those dependencies may either be directly visualized to a user as a metric, or used to calculate how the optimal configuration with respect to design and resource mapping alternatives may look, e.g., by taking performance objectives and modification constraints into account.

The developer 102 may cause the development model 402 to be transformed 404 into a performance analysis view 406. As described, the performance analysis view may be considered to represent a viewpoint encapsulating performance data (e.g., performance-related characteristics and execution parameters). Hence, the performance analysis view may be used to calculate the metrics providing performance related decision support. Based on the stepwise approach of FIG. 5, an initial performance analysis model 520 and an extended performance analysis model 522 may be considered. The former may be based on, for example, development models annotated with resource demands and probabilities of paths, and may thus enable initial performance feedback in terms of upper and lower bounds in the absence of other factors, such as, for example, factors due to contention of resources. Then, as shown in FIG. 5, in order to give performance-related decision support, the initial performance analysis model may be used as one input for initial performance assessment 516.

The extended performance analysis model 522 may use more detailed information, and hence may require more effort by the developer 102. In more detail, the extended performance analysis model 522 may additionally take into account factors due to contention for resources, enabling more detailed scenario specific performance prediction, including prediction of resource utilization. For example, the extended performance analysis model may be simulated or analytically solved and may therefore contain information about utilization of resources. As shown, the extended performance analysis model may be used as one input for the extended performance assessment 518.

Further in FIG. 4, a composition 412 may occur, e.g., using the composition engine 134 as described herein, to obtain the assessment computation model 414. An assessment computation 416 may follow to obtain the performance assessment view 418.

The performance assessment view, as already referenced, may provide performance related decision support for non-performance experts in terms of what in a design and resource mapping has to be changed to get improved results with regard to performance objectives and modification constraints. In the stepwise approach of FIG. 5, initial performance assessment 516 may provide performance related decision support in the absence of concrete usage scenarios, including information about factors due to contention of resources. In the second step, the extended performance assessment 518 takes into account additional factors due, for example, to contention of resources, resource related requirements, and resource related constraints.

For the initial and extended performance assessments, metrics may be calculated from the other three views 404, 406, 410 to provide decision support. As described above, different metrics may be supported at each assessment step. For example, the metric Step Performance Importance (SPI) may be supported at the initial performance assessment 516, while the metric Bottle Neck Strength may be supported at the extended performance assessment 518.

Here, the SPI metric depicts the impact of processing time changes of a process step, e.g., depicts the importance of decreasing resource demands of a process step or increasing of resource quality or quantity on the overall performance. SPI may be calculated for each step in a model from the probabilities of paths available in the initial performance analysis model as shown in Eq. 1:

$$SPI_s = \sum_{i=0}^{n_s} p_i \quad \text{Eq. 1}$$

wherein S=a step in a model, $n_S$=a number of possible paths to S, and $p_i$=a probability of path i. Then, the results may be shown only for these steps which are defined as variable in the modification constraint view and which are marked as improvable in the performance objective view.

Figure 6:
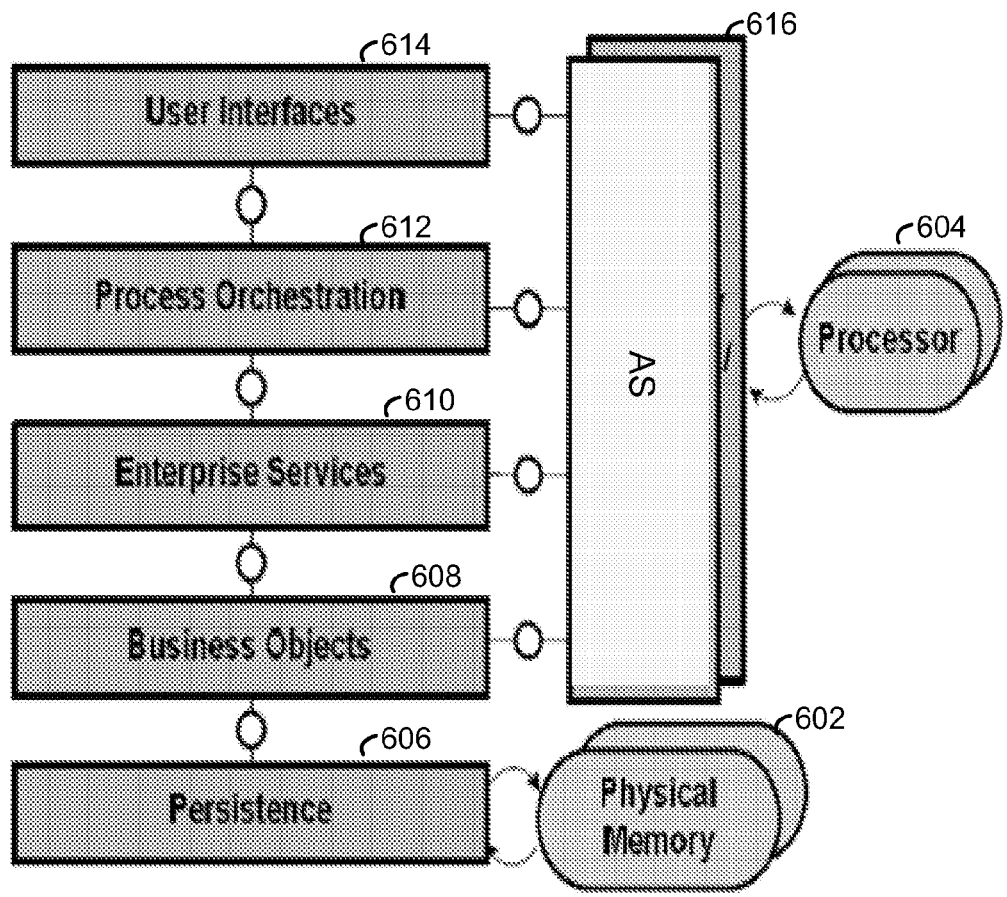
FIG. 6 is a block diagram of a layered software architecture that may be used in the system of FIG. 1.
Figure 7:
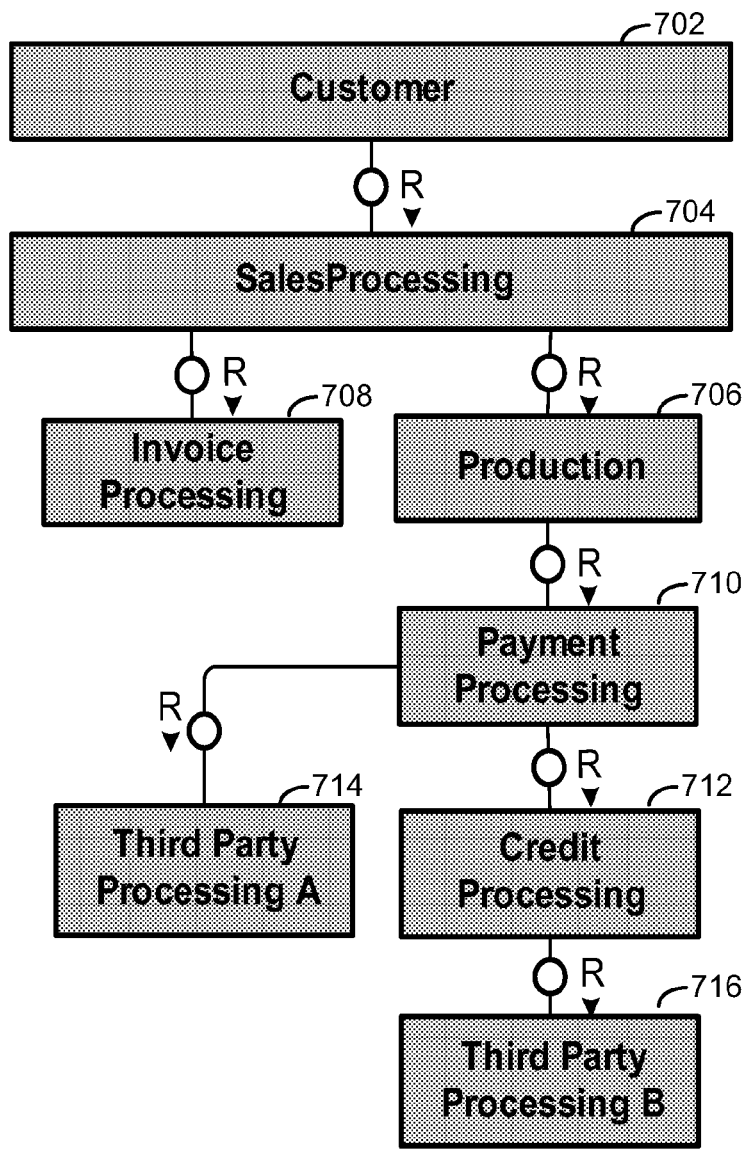
FIG. 7 is a block diagram of a layered business process that may be used in the system of FIG. 1.
Figure 8:
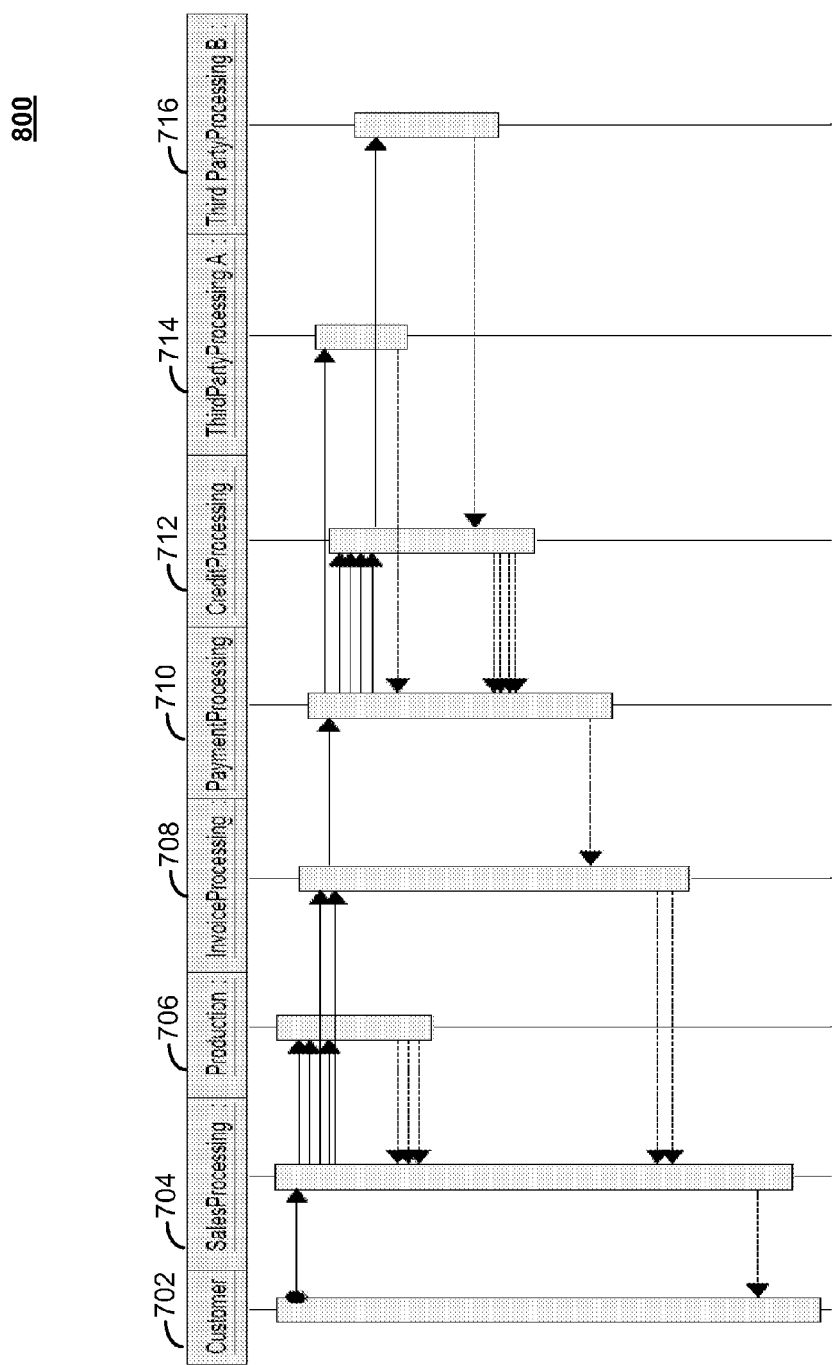
FIG. 8 is a block diagram of an example development model that may be used in the system of FIG. 1.

Meanwhile, bottle neck strength may be calculated for models showing layered use of resources, such as shown and described with reference to FIGS. 6-8, are available and if they contain information about resource utilization. As referenced above, an instance of an (extended) performance analysis model may be represented by a core scenario model (CSM), and the bottleneck strength may be defined according to Eqs. 2 and 3:

$$\text{Shadow}(R) = \text{argmax}_{r \text{requested by}(R)} \text{utilization}_r \quad \text{Eq. 2}$$

$$BStrength_R = \frac{utilization_R}{utilization_{Shadow(R)}} \quad \text{Eq. 3}$$

where R=hardware/software resource of a step, and r=another resource which is requested by R.

In Eq. 3, the term "BStrength" enables bottle neck characterization for layered resource consumption. For example, a resource with the largest BStrength and utilization over 0.9 may be interpreted as the bottleneck of the system. The modification constraint view and the performance objective view may be used to automatically propose concrete design and resource mapping alternatives, and/or to filter the visualization of BStrength values. Consistent with the SPI metric as described above, BStrength may be visualized only for those parts in a model that are not fulfilling performance requirements defined within the performance objectives or which are marked as improvable in the performance improvements and where the resource mapping constraint does not prevent the use of more resources.

Returning to a more specific example(s) of FIGS. 4 and 5, an example implementation supports UML2.0 models as development models, and may use UML Activity Diagrams and/or Deployment Diagrams. Both types of models may be annotated with performance data conforming to the UML SPT profile. In addition to the SPT profile, other profile(s) may be defined (e.g., using UML) in order to specify specific desired semantics, such as, for example, the expression of enterprise services.

Then, to obtain an initial performance analysis view, the UML Activity Diagram may be annotated with resource demands of actions and probabilities of paths. Information may be added concerning contention of resources to the activity diagram and the deployment diagram to transform them via ATL transformation to the extended performance analysis model. For example, two kinds of extended performance analysis models may be generated: a Tool Independent Performance Model (TIPM) and a Tool Specific Performance Model (TSPM). The TIPM may be defined as a refined and slightly extended version of the Core Scenario Model (CSM). The TSPM may be used as input for the simulation tool AnyLogic or other simulation/visualization tools. The resulting information from the simulation about utilization of resources may be annotated back to the TIPM which has been then used as input to the extended performance assessment view.

In order to specify the modification constraints view and performance objective view, appropriate UML profiles may be defined. For example, a modification constraint profile may include two stereotypes which can be attached on UML.ExecutableNodes: ResourceDemandsConstraint which is defined by the value that can be fixed or changeable and ResourceMappingConstraint which is defined by the integer values minMultiplicity and maxMultiplicity. Of course, these are merely examples, and more detailed or expressive profiles also may be used.

Meanwhile, in order to express Performance Requirements as part of a performance objectives profile, the UML SPT profile may be used. Alternatively, and particularly to merge the view points of performance objectives and the performance analysis into one profile and also to express performance improvements, a UML Profile may be used that contains the stereotypes ExecutionTimeRequirement and ResourceRequirement, which can be applied on UML.ExecutableNodes. ExecutionTimeRequirement specifies the overall time to execute an ExecutableNode. The stereotype is specified by its maximumExecutionTime and the Boolean value Improvable, which specifies if the value should still be reduced if the maximumExecutionTime criterion has been reached. The stereotype ResourceRequirement specifies the range of resource utilization to be achieved (maxUtilization and minUtilization). To express future improvements the ResourceImprovement stereotype currently includes two structures; one of these contains the required integer field improveTowardsMinExecutionTime and the optimal boolean field weight, while the other structure contains the required integer field improveTowardsMaxUtilization and the optimal boolean field weight.

An example performance assessment profile may include two stereotypes which can be attached on UML.ExecutableNodes: AssessmentMetric and AssessmentOptimum. In order to model the two example metrics, AssessmentMetric may include one field per metric which are of type integer: BStrength and SPI, as these metrics are defined above. The AssessmentOptimum stereotype currently includes the integer field OptimumResourceDemands and OptimumResourceMapping, as described herein.

FIG. 6 is a block diagram of a layered software architecture that may be used in the system of FIG. 1. FIG. 6 illustrates an architecture structured in vertical layers accessible as software resources. The functionality provided by the different layers can be deployed in one or several instances of an Application Server (AS) 616 running on physical resources such as processors 604. A persistence layer 606 may use distributed data repositories illustrated as physical memories 602.

Business Objects 608 may be structured on top of the persistence layer 606 and may encapsulate semantic data, such as Sales Order data, and provide methods to manipulate them. Business Objects enable Business Processes and provide one or more Enterprise Services 610 which may be technically implemented as WebServices extended with proprietary features. Enterprise Services 610 may be provided by proprietary Business Objects as well as third party objects.

A Process Orchestration Layer 612 may define business control logic and be exposed by user interfaces 614. The Enterprise Services 610 may provide access to business specific data or functionality that can be used to compose business processes. In the example architecture, at least two kinds of process orchestrations may be used, depending on the lifecycle of the orchestrated process. Specifically, back-end process orchestration may be performed to define processes with longer lifecycles, such as sales order processing, whereas front-end orchestration may be performed to compose processes with shorter lifecycles.

As referenced above, it may be difficult to deal with the interpretation of performance analysis results for orchestrated processes 612 on top of the complex Enterprise SOA architecture(s) such as that of FIG. 6. For example, in the layered architecture including the Persistence, Business Objects, Enterprise Service, Process Orchestration and User Interface Layers, a bottle neck in one layer may in fact result in a bottle neck in another layer by push-back. Additionally, the high degree of flexibility for deploying the system on physical resources and the integration of 3rd party services may complicate performance analysis.

However, the present description helps to enable interpretation of performance analysis results. The described approach integrates the performance analysis results into development models, which in the example of FIG. 6 may include models of orchestrated processes on top of Enterprise SOA. The approach may provide decision support for non-performance experts in terms of what in a design and resource mapping has to be changed to get better results with regard to performance objectives.

FIG. 7 is a block diagram of a layered business process that may be used in the system of FIG. 1. That is, whereas FIG. 6 is directed to a technical implementation of the system 100 with respect to an example software architecture, FIG. 7 is directed more to a business-based example, and with reference to a corresponding model and scenario as described with respect to FIG. 8, below, which provides an example of a UML sequence diagram.

By way of overview, in FIGS. 7 and 8, functionality provided by an underlying technical architecture such as shown in FIG. 6 may be organized in functional units referred to herein as process components, where the behavior within such process components may be available as a model(s). FIG. 7 illustrates how several such process components may be combined to perform the processing of a sales order. In the example, the process components are structured as layered business processes, and require input by different departments.

Known Business Intelligence (BI) metrics allow for the collection of performance related data for business processes, and Key Performance Indicators (KPI's) may be defined to identify targets for executed business processes. Tool support exists to compute deltas between measured performance data out of the BI with KPI's, in order to identify areas of further improvements. However, it may be difficult to interpret these deltas for non-performance experts, since the structure of business processes is layered as described and illustrated. As referenced above, this results in a layered use of resources, where a bottle neck in one layer (e.g. credit card processing) may in fact result in a bottle neck in another layer by push-back.

The example(s) of FIGS. 7 and 8 reflect behavior between business departments 702-716 working on business process steps encapsulated as process components, and allow for extended performance assessment, so that information about resource contention may be used. For example, performance data for the performance analysis view/model may be the result out of a simulation, or, the data may be measured if the system is already productive. For the sake of the example, one-to-one mapping between process components and departments which are defined in a UML Deployment diagram is assumed, and using the following parameters as shown in Table 1: (1) D=Name of the department processing the ProcessComponent; (2) $m_D$=Multiplicity of employees currently working for department D; (3) $t_D$=Local service time of one employee in the department D to process a request; and $u_D$=Utilization of department D.

TABLE 1

| Department | $m_D$ | $t_D$ (days) | $u_D$ |
| --- | --- | --- | --- |
| Customer | 50 | 10 | 1 |
| SalesProcessing | 20 | 0.01 | 0.92 |
| Production | 15 | 0.5 | 0.97 |
| InvoiceProcessing (Third Party) | 1 | 0.01 | 0.06 |
| PaymentProcessing | 5 | 0.01 | 0.99 |
| CreditProcessing | 3 | 0.05 | 0.77 |
| ThirdParty Processing A | 5 | 0.01 | 0.18 |
| ThirdParty Processing B | 1 | 0.01 | 0.37 |

For the sake of the example scenario, the business performance may be unacceptable, since the time for processing a Sales Order (e.g., a total of 16.3 days, where an actual performance requirement may specify a time less than or equal to 15 days) is larger than desired.

As shown in Table 1, a utilization of some departments is over 90% (Customer 702, SalesProcessing 704, Production 706, and PaymentProcessing 710) which may indicate that one of the departments performing SalesProcessing 704, Production 706, or PaymentProcessing 710 may be a bottleneck (the Customer department triggers the workflow and can therefore not be the bottleneck). In order to address this issue, the responsible manager may consider shifting two employees from another part of the company. Both employees could be shifted, for example, either to the PaymentProcessing 710 or to the Production department 706. Additionally it would be possible to spend budget on educating the SalesProcessing department 704 which may then decrease their local service time by, for example, 20%. Consequently, in the example, the following issues may be addressed using the system 100 of FIG. 1, i.e., which of the departments should get one or both of the new employees, and whether it make sense to educate the SalesProcessing department 704.

To implement the performance analysis model for this example, the performance data of Table 1 may be depicted as UML.SPT annotations, which may then be modeled in a language suitable for execution by the annotation engine 202 of FIG. 2 (e.g., the QUAL language referenced above), as shown in Code Section 1, which details a specification for PaymentProcessing (in which an extension to the SPT profile referred to as "multiplicity" is used):

Code Section 1

```
Program
{
    Query
    {
        PaymentProcessing := Select Lifeline
            From SellFromStockModified
            Where name = "PaymentProcessing";
        PaymentProcessingDepartment := Select Device
            From SellFromStockModifiedDepartments
            Where name = "PaymentProcessingDepartment";
    }
```

-continued

Code Section 1

```
PaymentProcessing.adapt
{
    SPTProfile
    {
        PStep
        {
            executionTime := 0.01;
            host := PaymentProcessingDepartment;
        }
    }
}
PaymentProcessingDepartment.adapt
{
    SPTProfile
    {
        PProcessingResource
        {
            Utilization := 0.996
            throughput := 9.18
            multiplicity := 5;
        }
    }
}
```

Table 2 depicts a modification constraint view including Resource Mapping Constraints and Resource Demands Constraints, as described above, for the different departments:

TABLE 2

| Department | Resource Mapping Constraint | Resource Demands Constraint |
|---|---|---|
| Customer | minMultiplicity = 50 maxMultiplicity = 50 | value = fixed |
| Sales Processing | minMultiplicity = 20 maxMultiplicity = 20 | value = changeable |
| Production | minMultiplicity = 15 maxMultiplicity = 17 | value = fixed |
| Invoice Processing | minMultiplicity = 1 maxMultiplicity = 1 | value = fixed |
| Payment Processing | minMultiplicity = 5 maxMultiplicity = 7 | value = fixed |
| Credit Processing | minMultiplicity = 3 maxMultiplicity = 3 | value = fixed |
| ThirdParty Processing A | minMultiplicity = 5 maxMultiplicity = 5 | value = fixed |
| ThirdParty Processing B | minMultiplicity = 1 maxMultiplicity = 1 | value = fixed |

Assuming for this example that only one department may decrease their local service time per employee (since only the production department may be educated), then the ResourceDemandsConstraints may be defined as fixed for all other departments and defined as changeable for the SalesProcessing department 704. Two new employees may be under consideration who may be shifted to either the PaymentProcessing 710 or the Production department 706. Within the stereotype ResourceMappingConstraints, the maxMultiplicity of the PaymentProcessing and the Production departments are modeled to be increasable by two, as shown in Table 2, while all other departments are not able to change their headcount.

Regarding the performance objective view, appropriate profiles may be defined as referenced herein and as would be apparent. The performance objectives may be modeled as UML Scenario model annotations. For example, an ExecutionTimeRequirement may be <=15 days, while a ResourceRequirement may be <=104 employees, and an improveTowardsMaxUtilization=true all may be set. That is, the ExecutionTimeRequirement is specified in this example to be less or equal to 15 days, while we are modeled that we are able to use maximal 104 employees as specified within the ResourceRequirement. If it assumed that profit should be maximized, we specify to optimize the utilization of all departments (improveTowardsMaxUtilization=true).

In implementations in which the annotation engine 202 (and related elements) of FIG. 2 are used, then the annotation extension provider 224 may be used to calculate a performance assessment view. Further, the same or different annotation engine 202 may be used to annotate the calculated performance-based characteristics, e.g., metrics representing performance assessment information, back to the original development model.

TABLE 3

| Department | BStrength | SPI |
|---|---|---|
| SalesProcessing | 0.92 | 1 |
| Production | 0.97 | 3 |
| PaymentProcessing | 1.29 | 3 |

The Bottleneck Strength values in Table 3 delineate that PaymentProcessing is the real bottleneck within the system. The other two suspected bottlenecks may just result out of a push-back effect from PaymentProcessing. The low SPI value (which can be already calculated as Initial Performance Assessment 516) of SalesProcessing in comparison to the high values of Production and PaymentProcessing indicates the relatively low importance of SalesProcessing for the overall performance. Hence, an indication is given that we currently do not need to educate the SalesProcessing department.

Additional to performance assessment related metrics, it is possible to use the information available from the multiple views, which are composed in the Assessment Computation Model, to automatically propose how an optimal design/resource mapping should be implemented. Again, the annotation extension provider 224 may be used to perform the calculation of optimal solutions and annotating the results back to the original models. Also, in the example of FIGS. 7 and 8, the example depicted here enables the simulation of variants of the configuration/design possibilities and selection of the best one with regards of the modification constraint view and the performance objectives view.

In a multi objective problem, m functions may be optimized at the same time. The space of possible solutions is limited by the definition of constraints limiting the solution space. Mapped to the approach described here, the Performance Improvements modeled in the Performance Objective View (for Initial Performance Assessment) are interpreted as the functions to be optimized. The Performance Requirements modeled in the Performance Objective View (for Extended Performance Assessment) and all Modification Constraints are interpreted as the constraints limiting the solution space.

Multi-objective optimization problems may be solved to find optimal solution(s) with help of, for example, evolutionary algorithms. Evolutionary algorithms enabling exploring of the solution space in order to find optimal solution(s) with much less simulations than just trying out all possible solutions in the solution space which is impossible for some cases.

In case a user does not like to wait until the solution space is discovered by the combination of evolutionary algorithm and simulations, then the developer 102 may use the weight field (within the ResourceImprovement stereotype defining the Performance Objective Improvements) in order to assign weights to the multiple ResourceImprovement. In case all ResourceImprovement are weighted, the Minima or Maxima of a Single-Objective function may be considered by transforming the multi-objective problem to a single-objective problem.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product tangibly embodied on a non-transitory computer-readable medium and including executable code that, when executed, is configured to cause at least one data processing apparatus to:
    determine a development model associated with development of a software process, the development model including nodes and branches joining the nodes to define an execution of the software process;
    determine a performance analysis model that includes performance data characterizing the execution of the software process, the performance analysis model being adapted for simulation of the development model therewith;
    determine a modification constraint profile characterizing configuration options for implementing the development model;
    determine a performance objective profile characterizing performance objectives of the execution of the software process;
    annotate the performance analysis model using the modification constraint profile and the performance objective profile to obtain an assessment computation model;
    calculate performance assessment data characterizing potential alterations of the development model to obtain improved execution of the software process, based on the configuration options and the performance objectives;
    annotate the assessment computation model using the performance assessment data to obtain a performance assessment model; and
    provide the performance assessment model for use in determining how to implement the potential alterations of the development model to obtain the improved execution of the software process.

2. The computer program product of claim 1 wherein the performance data of the performance analysis model is obtained from one or both of an actual or simulated execution of the development model.

3. The computer program product of claim 1 wherein the modification constraint profile specifies the configuration options as ones associated with the development model that specify one or both of a possibility or an extent of modification to the development model.

4. The computer program product of claim 1 wherein the performance objective profile specifies one or both of performance requirements or performance improvements of the software process.

5. The computer program product of claim 1 wherein the executable code, when executed, causes the at least one data processing apparatus to:
    determine the performance analysis model by querying a model repository to obtain the performance analysis model therefrom and using a query characterizing the performance analysis model for selection thereof;

determine the modification constraint profile by querying a modification constraint profile repository using at least one query characterizing the modification constraint profile;

determine the performance objective profile by querying a performance objective profile characterizing the performance objective profile; and obtain the performance analysis model, the modification constraint profile, and the performance objective profile as query results.

6. The computer program product of claim 5 wherein the query results are obtained using one or more queries having one or more of a semantic characterization, a syntactic characterization, or a type-level characterization of desired query results.

7. The computer program product of claim 1 wherein the performance assessment data includes a performance metric associated with one of the nodes of the development model and characterizing an extent to which the node negatively affects the execution of the software process and therefore is associated with the potential alterations and the improved execution of the software process.

8. The computer program product of claim 1 wherein the performance assessment data includes a performance optimization associated with selections from among a number of combinations of the potential alterations based on an extent to which each of the selections affects the execution of the software process to obtain the improved execution of the software process.

9. A system comprising:
at least one processor;
non-transitory computer-readable storage medium including instructions executable by the at least one processor, the instructions configured to implement,
a modeling tool configured to determine a development associated with development of a software process, the development model including nodes and branches joining the nodes to define an execution of the software process;
a transformation tool configured to determine a performance analysis model that includes performance data characterizing the execution of the software process, the performance analysis model being adapted for simulation of the development model therewith;
a modification constraint view generator configured to determine a modification constraint profile characterizing configuration options for implementing the development model;
a performance objective view generator configured to determine a performance objective profile characterizing performance objectives of the execution of the software process;
a composition engine configured to annotate the performance analysis model using the modification constraint profile and the performance objective profile to obtain an assessment computation model;
an assessment computation engine configured to calculate performance assessment data characterizing potential alterations of the development model to obtain improved execution of the software process, based on the configuration options and the performance objectives;
the assessment computation engine configured to annotate the assessment computation model using the performance assessment data to obtain a performance assessment model; and
a performance assessment view generator configured to provide the performance assessment model for use in determining how to implement the potential alternations of the development model to obtain the improved execution of the software process.

10. The system of claim 9 wherein the performance data is determined from one or both an execution or a simulated execution of the development model.

11. The system of claim 9 wherein the composition engine comprises:
a query interpreter configured to query a development model repository to obtain one or more elements of the development model;
a profile reader configured to read, from a user-specified performance profile repository, at least one user-specified performance profile meta-model that is associated with at least one annotation; and
a profile integrator configured to annotate the one or more elements with the at least one annotation to obtain the assessment computation model.

12. The system of claim 9 wherein the assessment computation engine comprises:
a query interpreter configured to query an assessment computation model repository to obtain one or more elements of the assessment computation model;
a profile reader configured to read, from a performance assessment profile repository, at least one performance assessment profile meta-model that is associated with at least one annotation;
an annotation extension provider configured to determine the performance-based characteristic in association with the at least one annotation; and
a profile integrator configured to annotate the one or more elements with the at least one annotation including the performance-based characteristic to obtain the performance assessment model.

13. The system of claim 9 comprising a performance assessment profile repository configured to store a performance assessment profile, wherein the assessment computation engine is configured to determine the performance assessment model by calculating the performance-based characteristic based on the performance assessment profile and then annotating the assessment computation model using the performance assessment profile.

14. The system of claim 9 wherein the performance assessment data includes a performance metric associated with one of the nodes of the development model and characterizing an extent to which the node negatively affects the execution of the software process and therefore is associated with the potential alternations and the improved execution of the software process.

15. A method performed by one or more processors comprising:
determining a development model associated with development of software process, the development model including nodes and branches joining the nodes to define an execution of the software process;
determining a performance analysis model that includes performance data characterizing the execution of the software process, the performance analysis model being adapted for simulation of the development model therewith;
determining a modification constraint profile characterizing configuration options for implementing the development model;
determining a performance objective profile characterizing performance objectives of the execution of the software process;

annotating the performance analysis model using the modification constraint profile and the performance objective profile to obtain an assessment computation model;

calculating performance assessment data characterizing potential alterations of the development model to obtain improved execution of the software process, based on the configuration options and the performance objectives;

annotating the assessment computation model using the performance assessment data to obtain a performance assessment model; and providing the performance assessment model for use in determining how to implement the potential alterations of the development model to obtain the improved execution of the software process.

\* \* \* \* \*